May 21, 1929.  A. E. SMITH  1,714,324
DISHWASHING MACHINE
Filed April 14, 1928
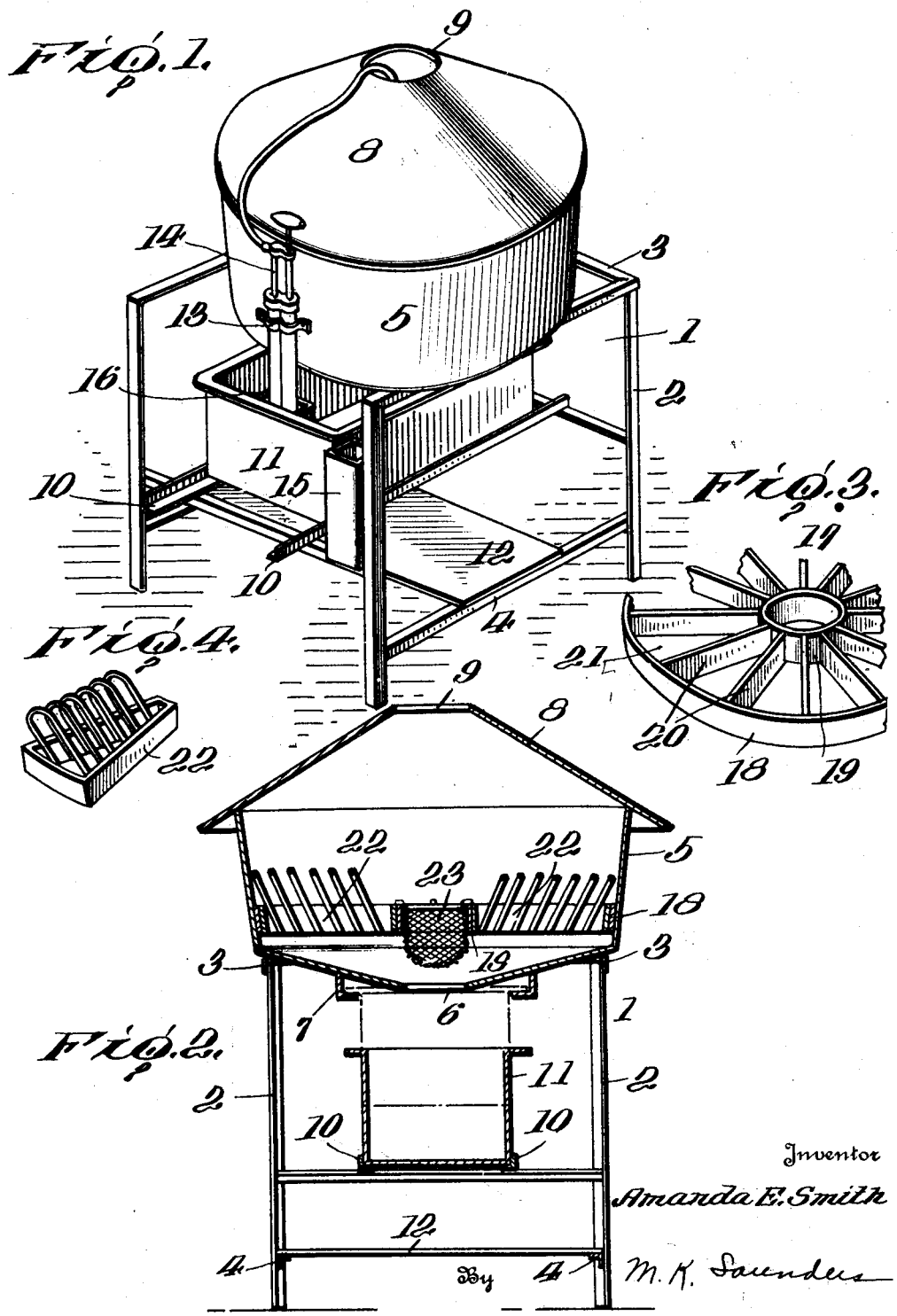
Inventor
Amanda E. Smith
By M. K. Saunders
Attorney Patented May 21, 1929.

1,714,324

UNITED STATES PATENT OFFICE.

AMANDA E. SMITH, OF CAMPBELL, NEBRASKA.

DISHWASHING MACHINE.

Application filed April 14, 1928. Serial No. 269,998.

This invention relates to dish washing machines and the object of my invention is to provide a dish washing machine for home use which is economical in construction and efficient in operation.

Another object of my invention is to provide a domestic dish washing machine which may be readily moved from place to place and one which does not require any special installation.

Still another object of my invention is to provide a domestic dish washing machine which is comprised of but few parts none of which are of complicated structure.

I accomplish the above, and other objects of the invention, which will be apparent as the description proceeds, by means of the apparatus shown in the accompanying drawings, in which Figure 1 is a perspective of my improved dish washing machine, when set up ready for use;

Figure 2 is a central vertical sectional view through the dish washing machine shown in Figure 1;

Figure 3 is a perspective of the dish receiving tray, parts being broken away; and Figure 4 is a perspective of one of the dish holding racks.

On the drawings, in which like reference characters indicate like parts on all the views thereof, 1 indicates a stand of skeleton formation comprising four vertical supports 2 and horizontal top rails 3 and horizontal bottom rails 4.

On the top rails is slidably supported a container 5 for containing the dishes during the washing operation. The dish container 5 has an opening 6 in the bottom thereof, which bottom may slope in all directions toward the opening 6 so as to provide a convenient drain for the pan. On the exterior of the bottom of the pan are secured angle pieces 7 for supporting the dish water pan. A cover 8 is provided for the dish pan having an opening 9 in the top thereof for a purpose which will presently appear.

Extending from the front to the rear of the stand and below the top rails thereof are horizontal rails 10 which are adapted to slidingly support the dish water pan 11 beneath the pan. The dish water pan is provided with outwardly turned flanges at its upper edge which may engage in the angle pieces 7 on the bottom of the dish pan if it is desired to support the dish water pan closer to the dish pan to prevent splashing.

In the lower part of the stand and beneath the rails 10, which support the dish water pan, is a shelf 12 for a heater (not shown).

Secured to the exterior side of the dish pan is a spring clamp 13 for supporting the upper portion of a spray pump 14 during the operation of the apparatus as is shown in Fig. 1, the clamp 13 preferably consisting of a metal strap having two curved portions which clasp the barrel portions of the spray pump. Secured to one of the vertical supports of the stand is a holder 15 in which the pump may be placed when not in use. On the interior of the dish water pan adjacent the front wall thereof is a strap 16 which cooperates with the clamp 13 to hold the spray pump in operative position.

Removably supported within the dish pan is a tray 17 for holding the dishes to be cleansed. This tray is of skeleton formation and comprises a circular or other shaped band 18 conforming to the periphery of the dish pan. A central circular band 19 forms the center of the tray, partitions 20 radiating from the band 19 to the band 18 thus forming compartments 21 for the dishes. In each of these compartments may be placed wire trays 22 for holding the dishes. Removably supported from the central band 19 is a small basket 23 which is preferably provided with hooks whereby it may be supported from the band 19. This basket provides a tray for the silver to be washed.

In operation the dish water pan 11 is filled with hot water and slid into position on the horizontal rails 10 of the stand. The dish pan 5 is placed upon its support and the dishes and silver in their respective trays properly located in the compartments designed therefor. The heater, which may be of the ordinary oil type, is lighted and placed upon the shelf 12 underneath the dish water pan. The spray pump is secured in the clamp on the dish pan with the inlet port resting in the water, and the hose discharge of the pump extending into the opening 9 in the top of the dish pan cover. Obviously the operation of the pump will spray the water over the dishes in the dish pan, which water will run off through the opening 6 into the dish water pan. Continuous operation of the pump will thoroughly cleanse the dishes of all of the food thereon, since it will provide a continuous circulation of the cleansing fluid, the heater meanwhile keeping the water at the desired temperature.

After the food has been thoroughly washed from the dishes, the dish water pan containing the soiled water may be removed and fresh water placed therein, so as to thoroughly rinse the dishes by a continuous operation of the pump. Or, fresh scalding water may be poured into the top of the dish pan without operating the pump. It is obvious that after the washing and rinsing operation, it will only be necessary to allow the dishes to stand for a short time in order that they may become entirely dried.

It will thus be seen that I have provided a simple, effective apparatus for cleansing dishes which can be operated with a minimum of labor and expense, and a dish washing machine which may be set up in the ordinary household and eliminate much of the disagreeable task of washing dishes.

Having thus described my invention, what I claim as new, and desire to secure by Letters Patent, is:

1. A dish washing machine comprising a stand, a dish container mounted on said stand and having a drain opening in the bottom thereof, means for supporting dishes in said container, an independent water container removably supported on said stand below the opening in said dish container, and means for operatively supporting a spray pump in communication with the interior of both of said containers, said pump supporting means comprising a strap on the interior of the water container and a clamp on the exterior of the dish container.

2. A dish washing machine comprising a supporting stand, said stand having an open frame at the top thereof, an intermediate frame below said upper frame, a dish container having an opening in the bottom thereof removably supported by said upper frame, a water container removably supported by said intermediate frame, a shelf below said intermediate frame adapted to support a removable heater, a pump for conveying the water from the water container to the dish container and cooperating means on said dish container and said water container for removably supporting said pump in operative relation to said containers.

In testimony whereof I hereunto affix my signature.

AMANDA E. SMITH.